United States Patent [19]
Mieling

[11] Patent Number: 5,842,281
[45] Date of Patent: Dec. 1, 1998

[54] WHEELLESS ALIGNMENT APPARATUS AND METHOD OF USING SAME

[76] Inventor: James A. Mieling, 1030 Viking Ct., Batavia, Ill. 60510

[21] Appl. No.: 821,813

[22] Filed: Mar. 21, 1997

[51] Int. Cl.⁶ .................................................. G01B 5/255
[52] U.S. Cl. ..................................... 33/203.18; 33/203.19; 33/600
[58] Field of Search ........................... 33/203.18, 203.19, 33/600, 203, 203.12, 203.13, 203.14, 203.15, 203.16, 203.17, 203.2, 203.21

[56] References Cited

U.S. PATENT DOCUMENTS

| | | |
|---|---|---|
| 3,488,857 | 1/1970 | Bateman . |
| 4,607,436 | 8/1986 | Clay . |
| 4,782,596 | 11/1988 | Mieling ................................. 33/203.18 |
| 5,033,198 | 7/1991 | Hastings ............................... 33/203.18 |
| 5,101,569 | 4/1992 | Watkins . |
| 5,174,032 | 12/1992 | Beck . |
| 5,471,754 | 12/1995 | Mieling ................................. 33/203.18 |
| 5,619,800 | 4/1997 | Unruh ................................... 33/203.15 |

*Primary Examiner*—Christopher W. Fulton
*Attorney, Agent, or Firm*—Higgs, Fletcher & MackLLP; Bernard L. Kleinke, Esq.

[57] ABSTRACT

The wheelless alignment apparatus includes a rigid fixture having a strut assembly coupling portion and a pair of spaced apart support leg portions. An adapter plate coupled to the strut assembly coupling portion engages the vehicle strut assembly to secure the adapter plate and the rigid fixture to the vehicle. A pair of support flanges extending from the leg portions and having a group of horizontal offset openings cooperates with a pivot bar having two spaced apart pairs of fixture height members, each member having a group of vertical offset openings. The pivot bar rests on a turntable, and coupling pins extending through corresponding horizontal and vertical offset openings enable the rigid fixture to pivot for alignment purposes.

26 Claims, 4 Drawing Sheets

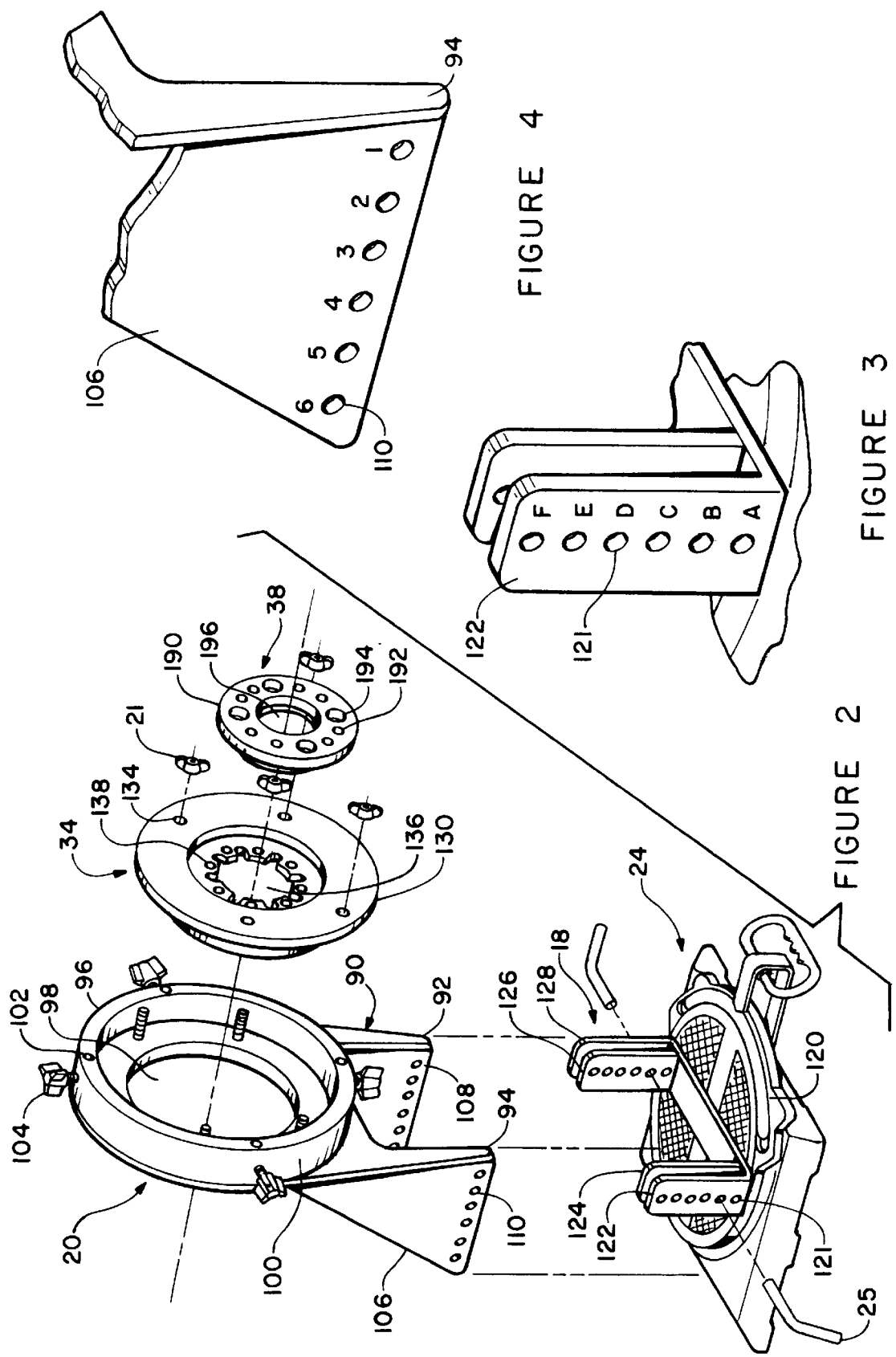

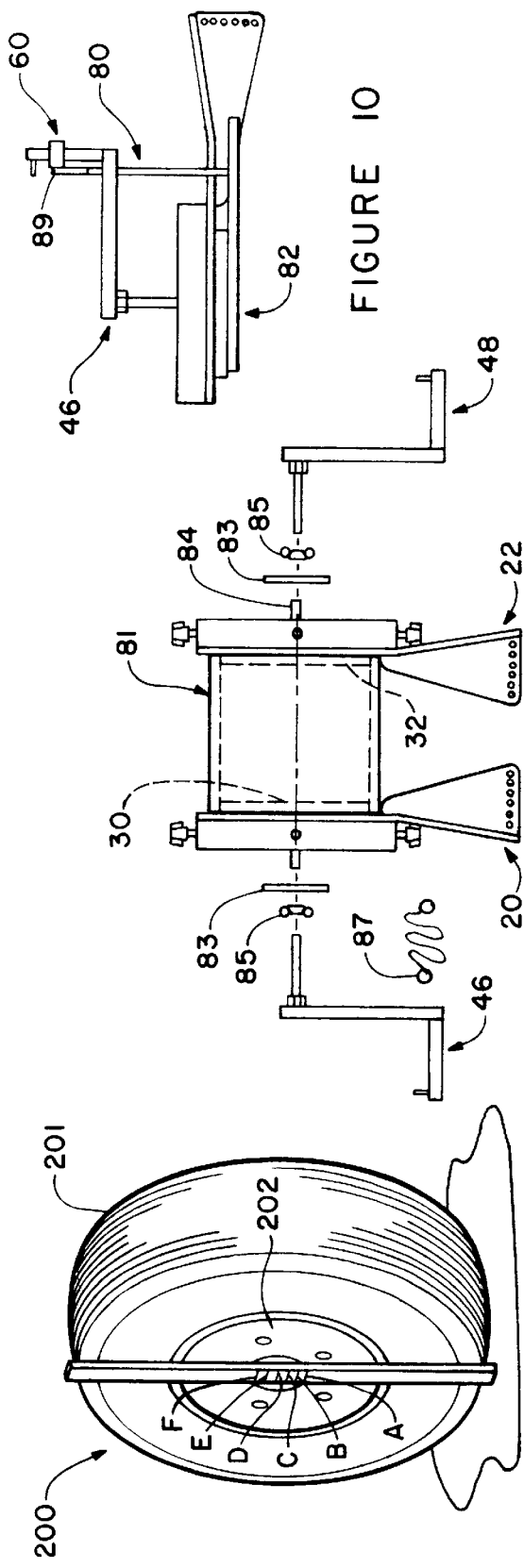

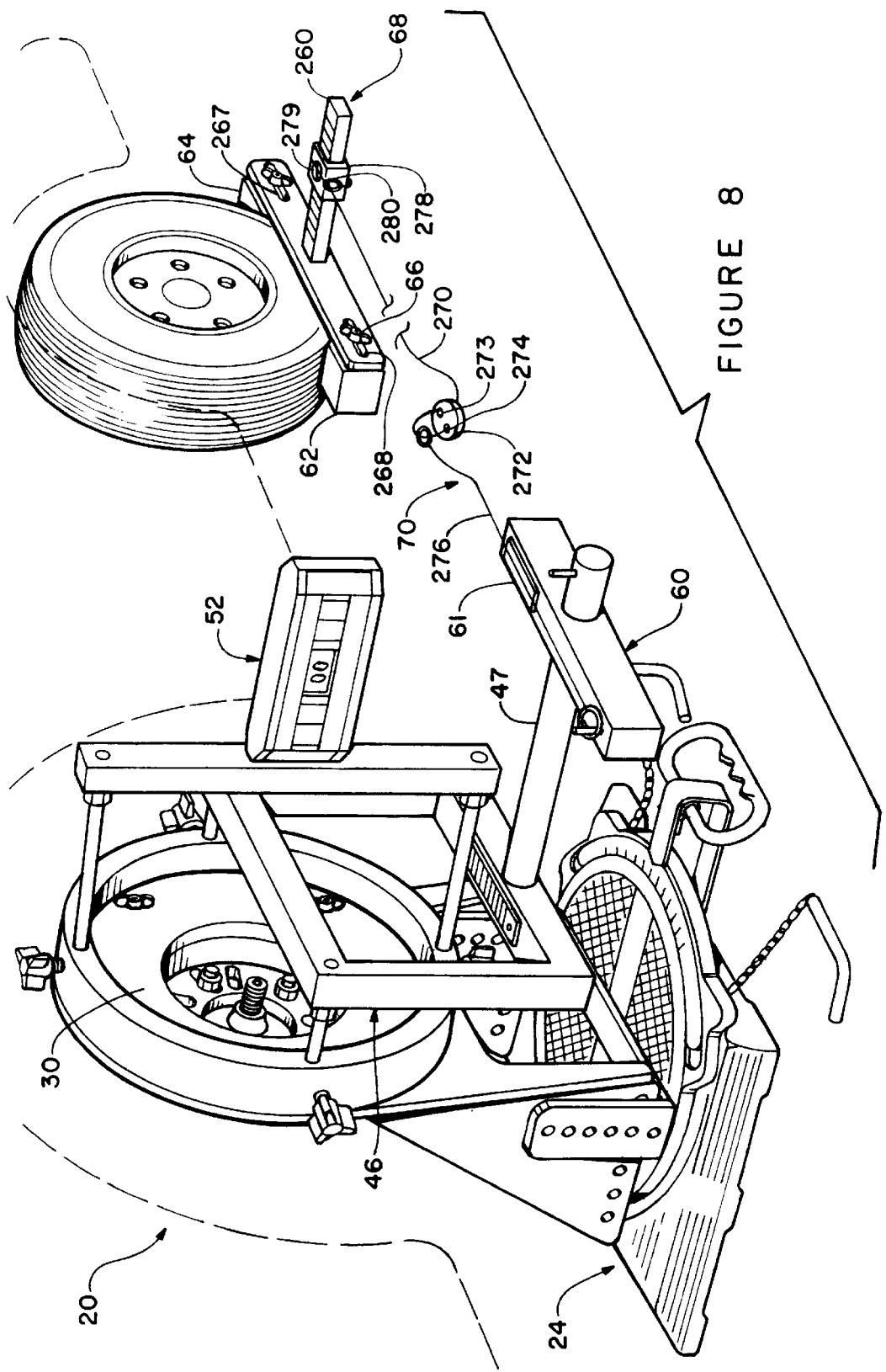

1

WHEELLESS ALIGNMENT APPARATUS AND METHOD OF USING SAME

TECHNICAL FIELD

The present invention relates in general to an improved apparatus for aligning vehicle wheels, and a method of accomplishing the alignment. The invention more particularly relates to a wheelless aligning apparatus, and method, to facilitate the alignment of strut mounted vehicle wheels.

BACKGROUND ART

The wheelless alignment of vehicles has been accomplished previously. For example, reference may be made to U.S. Pat. No. 3,488,857. Therein, a frame having inwardly curving leg members was disclosed for engaging the vehicle strut assembly to support the vehicle during wheel alignment measurements made while the wheel was removed from the vehicle.

The legs were pivotally connected to a pair of feet to permit the frame to pivot. A pair of openings in the foot enable the frame to be adjusted vertically into two positions. However, as the rim and tire of a wheel could vary substantially for various types of wheels, the disclosed alignment fixture was limited in its ability to compensate for various sizes of wheels.

Improved alignment fixtures were disclosed in U.S. Pat. Nos. 4,651,431; 4,782,596; and 5,471,754, which patents are incorporated as if fully set forth herein. The disclosed improved alignment fixture included an elongated rectangular block mounted pivotally to a rigid member in an offset member to enable the height of the fixture to be adjusted to form different height settings depending on the position of the block.

While such a device for adjusting the height of an alignment fixture has been adequate, it would be highly desirable to have a new and improved wheelless alignment apparatus which can be adjusted to accommodate a larger variety of wheel types and sizes, and a method for aligning a vehicle using the apparatus. Such an apparatus should be easy to use, and relatively inexpensive to manufacture.

SUMMARY OF THE INVENTION

Therefore, the principal object of the present invention is to provide a new and improved wheelless alignment apparatus, and a method of using it, for aligning a vehicle. The apparatus should be adjustable to accommodate various sizes of wheels, be relatively easy to use, and relatively inexpensive to manufacture.

Briefly, the above and further objects of the present invention are realized by providing a new and improved wheelless alignment apparatus, which can be used in a convenient manner according to a novel method.

The wheelless alignment apparatus includes a rigid fixture having a strut assembly coupling portion and a pair of spaced apart support leg portions. An adapter plate coupled to the strut assembly coupling portion engages the vehicle strut assembly to secure the adapter plate and the rigid fixture to the vehicle. A pair of support flanges extending from the leg portions and having a group of horizontal offset openings cooperates with a pivot bar having two spaced apart pairs of fixture height members, each member having a group of vertical offset openings. The pivot bar rests on a turntable, and coupling pins extending through corresponding horizontal and vertical offset openings enable the rigid fixture to pivot for alignment purposes.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is an exploded pictorial view of an alignment apparatus, which is also constructed in accordance with the present invention;

FIG. 3 is an enlarged cut-away view of a fixture height member, which is constructed in accordance with the present invention;

FIG. 4 is an enlarged cut-away pictorial view of a support flange, which is also constructed in accordance with the present invention;

FIG. 5 is a pictorial view of a removed wheel being measured to determine an appropriate vertical offset measurement according to the method of the present invention;

FIG. 6 is a pictorial view of the tire of FIG. 5 laying on a ground surface on its side for determining a tire width measurement according to the method of the present invention;

FIG. 7 is a pictorial view of the tire of FIG. 6 illustrating the determination of a wheel offset measurement according to the method of the present invention;

FIG. 8 is a pictorial view of a thrust measurement arrangement utilizing the kit of FIG. 1 according to the method of the present invention;

FIG. 9 is a pictorial view illustrating a toe calibration according to the present invention;

FIG. 10 is a pictorial view illustrating a thrust calibration according to the present invention; and FIG. 11 is a pictorial view illustrating a steering axis inclination measurement according to the present invention.

BEST MODE FOR CARRYING OUT THE INVENTION

Figure 1:
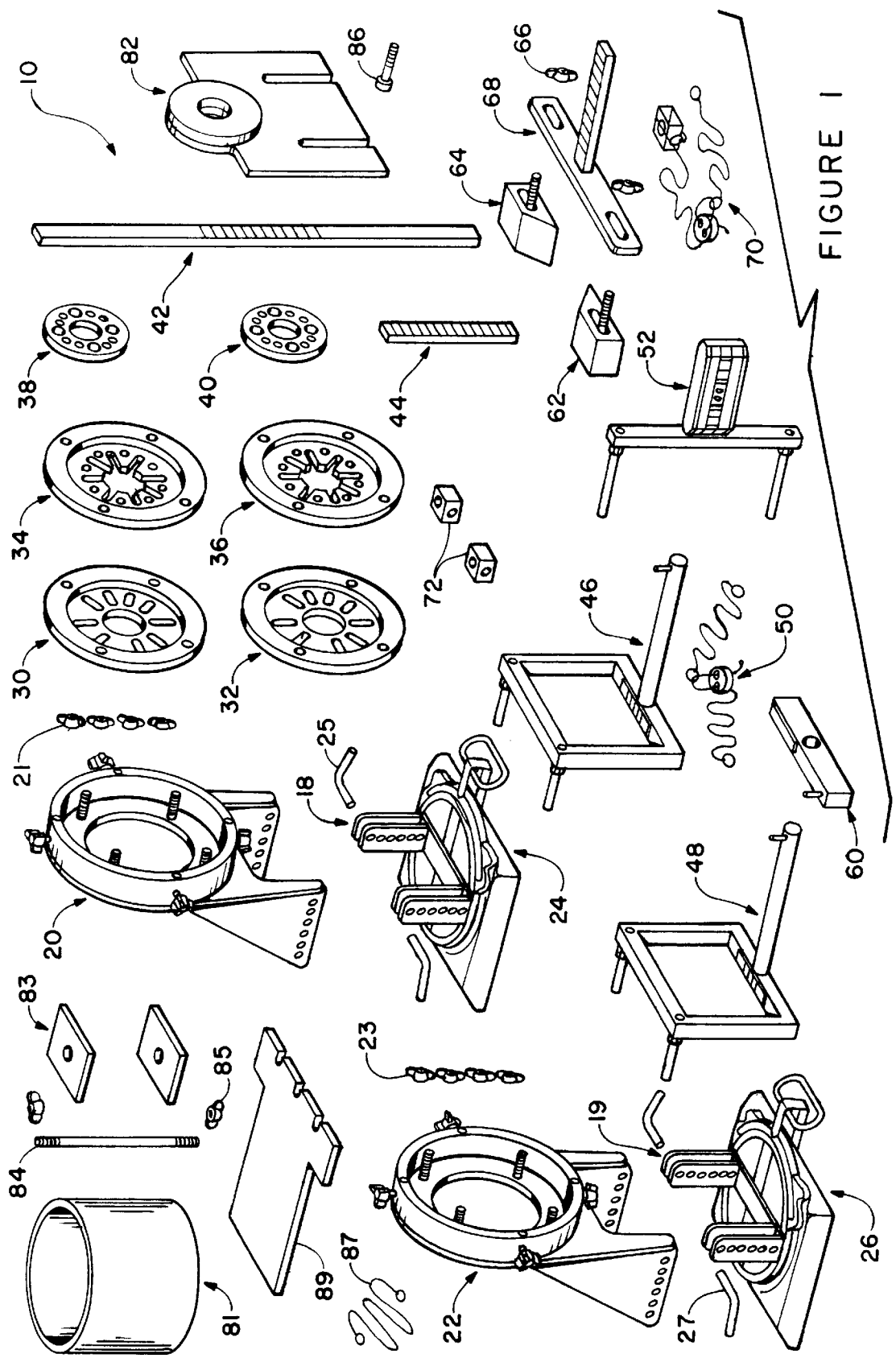
FIG. 1 is a pictorial view illustrating operative elements of a wheelless alignment kit, which is constructed in accordance with the present invention.

Referring now to the drawings, and more particularly to FIG. 1 thereof, there is shown a wheel alignment kit 10 which is constructed in accordance with the present invention. The kit 10 is used according to the method of the present invention to facilitate camber adjustments, wheel to wheel toe adjustments, and thrust angle adjustments in a fast and convenient manner.

The alignment kit 10 generally includes a pair of alignment devices 20 and 22. The devices 20 and 22 support a vehicle (not shown) in place of wheels (not shown) to facilitate wheel alignment in a wheelless manner. The devices 20 and 22 cooperate with turntables 24 and 26 to support the vehicle when the vehicle wheels are removed.

The kit 10 further includes a pair of toe gauge tools 46 and 48, and a camber gauge tool 52, to facilitate camber and toe readings during the wheelless alignment procedure. The toe gauge tools 46 and 48, and the camber gauge tool 52, and the method of using them, are described in U.S. Pat. No. 5,471,754, such description being incorporated by reference as if fully set forth herein. An adjustable toe line 50 cooperates with the toe gauge tools 46 and 48 to obtain the toe measurements.

Considering now the alignment devices 20 and 22, and the turntables 24 and 26, in greater detail with reference to FIGS. 1–4, only device 20 and turntable 24 will be discussed in greater detail as the devices 20 and 22, and the turntables 24 and 26, are substantially similar.

Referring now to FIG. 2, the alignment device 20 generally includes a rigid fixture 90 having an upper portion 96 for coupling to a vehicle strut assembly (not shown) and a pair of spaced apart support leg portions 92 and 94. Four mounting bolts, such as mounting bolt 96, are spaced apart around a central opening 98 in the upper portion 96 of the rigid member 90, and cooperate with four wing nuts, such as nut 21.

The alignment device 20 further includes a circular tubing member 100 having four openings, such as opening 102, for cooperating with the toe gauge tools 46 and 48, and the camber gauge tool 52. Securing devices, such as securing device 104, pass through the side of the tubing 100 to engage the tools 46, 48 and 52 to secure them to the device 20.

A pair of triangular support flanges 106 and 108 extend rearwardly from the respective leg portions 92 and 94 to facilitate the horizontal offset of the device 20. The flanges 96 and 108 each include a group of six horizontal offset openings, such as opening 110 in flange 106, for enabling the horizontal position of the support legs 92 and 94 to be adjusted. As best seen in FIG. 4, the openings, such as opening 110, are identified by numbers 1–6 indicated on the flanges at the openings to facilitate the adjustment of the device 20, and will be described hereinafter in greater detail.

Considering now the turntable 24 with reference to FIG. 2, the turntable 24 is substantially similar to the floating platform disclosed in U.S. Pat. No. 5,471,754, except the turntable 24 includes a base 120 for receiving a pivot bar assembly 18 including fixture height members 122, 124, 126 and 128 extending upwardly therefrom. The members 122, 124, 126 and 128 are arranged into two spaced apart pairs of members. In this regard, the pair comprising members 122 and 124 are spaced apart from the pair comprising members 126 and 128. Each member of the pair is further spaced apart from the other member of the pair. For example, member 122 is spaced apart from the member 124 and member 126 is spaced apart from member 128. The members 122 and 124, and 126 and 128, are spaced apart from one another to receive the corresponding flange member 106 and 108, respectively, therebetween.

The desired horizontal offset opening, such as opening 110, is aligned with the desired vertical offset openings, such as opening 121 of the members 122, 124, 126 and 128. Once the desired horizontal and vertical offset openings are aligned, a coupling pin/retaining clip, such as pin 25, is inserted through the desired horizontal and vertical openings to secure the fixture 90 to the turntable 24 in a pivoting manner.

Each one of the members 122, 124, 126 and 128 includes a group of six vertically aligned vertical offset openings, such as opening 121. As best seen in FIG. 3, the vertical openings, such as vertical offset opening 121, are identified by identifying letters A, B, C, D, E and F to facilitate the vertical adjustment of the fixture 20.

The kit 10 further includes two sets of adapter plates, including adapter plates 30, 32, 34, 36, 38 and 40, for enabling the alignment devices 20 and 22 to be utilized with a variety of vehicle strut assembly types. In this regard, the vehicle strut assemblies utilize various hub and lug bolt combinations to secure wheels to the vehicle. Thus, to enable the devices 20 and 22 to be used with the largest number of vehicle strut assembly types, the removable adapter plates 30, 32, 34, 36, 38 and 40 can be utilized as required to accommodate the particular vehicle strut assembly type.

The adapter plates 30 and 32 are general purpose adapter plates, and are suitable for most four and five lug bolt strut assembly vehicles. Adapter plates 34 and 36 are intended for use with strut assemblies utilizing six or eight lug bolts. Some newer vehicles, such as Dodge vehicles, Honda vehicles and Hyundai vehicles, cannot be accommodated by the adapter plates such as 30, 32, 34 and 36. Therefore, the kit 10 further includes adapter plates 38 and 40 for these newer vehicles.

Considering now the adapter plates 30, 32, 34 and 36, in greater detail, only adapter plate 34 will be described hereinafter in greater detail. The adapter plate 34 (FIG. 2) includes an outer rim portion 130 having four spaced apart openings, such as opening 134, and which correspond to the mounting bolts, such as mounting bolt 112, of the rigid fixture 90. The adapter plate 34 further includes a recessed interior portion 132 adapted to be received within the central opening 98. The interior portion 132 includes a group of spaced apart mounting openings, such as mounting opening 138, disposed about a central opening 136 for receiving and securing lug bolts (not shown).

The openings in the outer rim portion 130, such as opening 134, are aligned with the mounting bolts, such as mounting bolt 112. The adapter plate 34 is urged onto the rigid fixture 90 wherein the bolts, such as bolts 112, extend through the openings, such as opening 134, until the interior portion 132 is received snugly within the central opening 98. Securing wing nuts, such as wing nut 21, are twisted onto the bolts, such as bolt 112, to secure the adapter plate 34 to the rigid fixture 90.

Once the adapter plate 34 is properly secured to the rigid fixture 90, the strut assembly of the vehicle (not shown) may be engaged with the adapter plate 34. In this regard, the strut assembly lug bolts (not shown) are aligned with the lug bolt openings, such as lug bolt opening 138. The adapter plate 34 is then secured to the strut assembly using the wheel lug bolts (not shown), wherein the adapter plate 34 and the rigid fixture 90 are secured to the strut assembly.

Where the use of the adapter plate 38 is required, the adapter plate 34 must first be secured to the fixture 90. In this regard, the adapter plate 38 does not utilize mounting bolts to secure the adapter plate 38 to either the adapter plate 34 or the fixture 90. The adapter plate 38 includes an outer rim portion 190 and an interior portion 192 recessed from the outer end portion 190. The interior portion 192 is sized to correspond substantially to the diameter of the central opening 136 of the adapter plate 34.

When the interior portion 192 of the adapter plate 38 is received within the central opening 136 of the adapter plate 34, the outer rim portion 190 of the adapter plate 38 overlaps the interior portion 132 of the adapter plate 34. A group of lug bolt openings, such as lug bolt opening 194, and a central opening 196, enable the adapter plate 38 to be received on the lug bolts (not shown) in hub (not shown) of a vehicle corresponding to the adapter plate 38. The lug bolts (not shown) are tightened onto the strut assembly lug bolts to urge the outer rim portion 190 of the adapter plate 38 against the interior portion 132 of the adapter plate 34, thereby securing the adapter plates 38 and 34, and the fixture 90, to the vehicle strut assembly.

Considering now the determination of the suitable horizontal offset and vertical offset for use with a wheel with reference to FIGS. 3–7, the fixture height value corresponding to the vertical offset opening such as the opening 121 of number 122, is obtained using the ride height bar in cooperation with a vehicle wheel, such as wheel 200. The wheel 200, including the tire 21 and the rim 200, rests vertically on a supporting surface while the ride height bar 42 is placed against the wheel 200 in a vertical position, with the lower end of the ride height bar 42 in engagement with the ground surface.

The ride height bar 42 includes indicia or markings, such as A, D, C, D, E and F, for determining the proper vertical offset opening to use for the wheel 200. In this regard, the marking, such as markings A–F, are compared to the center of the strut assembly hub (shown in dashed lines). The marking most closely corresponding to the center of the hub is representative of the desired vertical offset opening. As shown in FIG. 5, the marking C is the closest marking to the center of the hub. As seen in FIG. 3, the opening 121 corresponds to the letter C. Thus, the vertical offset opening corresponding to C in the members 122, 124, 126 and 128 will be utilized for the wheel 200.

The horizontal offset position for use with the wheel 200 is determined by the tire width and the wheel offset according to Table I of Appendix "A" attached hereto.

The appropriate horizontal offset opening for use with the tire 200 is determined by the intersection of the horizontal tire width value with the vertical wheel offset value as determined by Appendix "A." The value determined at the intersection of the tire width and wheel offset determinations corresponds to the indicia, or markings, disposed adjacent to the horizontal offset openings, such as opening 110 (FIG. 4).

The determination of the tire width value for wheel 200 is obtained using the ride height bar 42 in conjunction with the wheel offset bar 44. The wheel 200 is positioned horizontally on the ground, and the ride height bar 42 is positioned across the top of the wheel 200, passing over about the center of the wheel 200. The wheel offset bar 44 is positioned vertically adjacent to the horizontal wheel 200, and a reading indicative of the intersection of the ride height bar 42 and with the wheel offset bar 44 is noted as the prior width value for use in Appendix "A."

The wheel offset value is determined with the wheel 200 and the wheel ride height bar 42 in the same position as used in determining the tire width value. However, the wheel offset bar 44 is positioned within the rim 202, and in engagement with the rim hub. Again, the intersection of the ride height bar 42 with the wheel offset bar 44 provides a value for use in Appendix "A," in this case, the wheel offset value.

As an example, where the tire width is determined to be about 7", and the wheel offset value is determined to be about 7.5", the horizontal offset opening positioned as determined by Appendix "A" is 6.

Referring now to FIG. 8, there is shown a thrust angle determination arrangement using the elements of the kit 10. In this regard, the alignment device 20 is coupled pivotally to the turntable 24 for facilitating camber, toe and thrust measurements. In this regard, the camber gauge toe 52 is coupled to the alignment device 20 for measuring camber.

Similarly, the toe gauge tool 36 is coupled to the alignment fixture 20, and is in position for making a toe measurement. However, as shown in FIG. 8, the gauge toe 46 is being utilized to facilitate the measurement of thrust angle. In this regard, a toe rod 47 extending outwardly from the toe gauge tool 46 is coupled to a thrust bar 60, wherein the thrust bar 60 has an opening therethrough to receive the rod 47.

Thrust indicia 61 on the thrust bar 60 enables the thrust line 70 to be positioned relative to the thrust bar for making thrust angle measurements.

To facilitating making thrust angle measurements, the kit 10 further includes a pair of chalk blocks 62 and 64, each having a bolt extending therefrom, for engaging a rear wheel. The kit 10 further includes a rear thrust measuring device 68. The thrust measuring device 68 includes an elongated thrust plate 266 having a pair of elongated slotted openings 267 and 268 at opposite ends thereof. The device 68 further includes an elongated rectangular thrust rod 266 connected to the thrust plate 266, and extending outwardly therefrom at about a right angle, and having measuring indicia thereon. A hollow elongated rectangular thrust collar 278 having a central opening 279 therein is adapted to be received slidably over the thrust drive 260. An indicating device, such as an O-ring 279, surrounds the thrust collar 278 at about the center of the opening 279 to facilitate aligning the indicating device and the thrust collar with the indicia on the thrust rod 260. Indentations or notches in the thrust collar secure the O-ring 280 in place.

Considering now the thrust line in greater detail with reference to FIG. 8, the thrust line generally includes elastic members 276 and 270, wherein number 276 is coupled to the thrust bar 60 while the member 270 is coupled to the O-ring 280. The thrust line further includes adjustment disk 272 for having openings 273 and 274 therethrough for adjusting the overall length of the thrust line 70.

In this regard, the member 270 is inserted through the opening 273 and inserted through the opening 274 to form a loop above the disk 272. The end of the member 270 is then tied into and out to prevent it from passing through the opening 274. The member 276 is connected to the looped portion of member 270 to complete compressed line 70.

The length of the overall thrust line 70 is adjusted by controlling the length of member 270 between the O-ring 280 and the disk 272. This is accomplished by pointing the knotted end of the member 270 until the desired length of the member 270 between the O-ring 280 and the disk 272 is achieved. When released, the disk 272 is hoisted by the opposing pull applied by the members 270 and 276, wherein the members 270 and 276 are engaged frictional by the disk 272 and the thrust line 270 is maintained in the desired length.

The kit 10 further includes calibration tools, including thrust calibration tool 80, calibration plate 82 and associated bolt 86, calibration cylinder 81, threaded rod 84 and associated nuts 85, and plates 83 for calibrating the system. As shown in FIG. 9, calibration cylinder 81 is disposed between devices 20 and 22 to calibrate toe readings. Devices 20 and 22 have adapter plates 30 and 32 secured thereto. Threaded rod 84 passes through the devices 20 and 22, and cylinder 81, and is secured by nuts 85 cooperating with plates 83 on either side of rod 84. Cylinder 81 is machined to have parallel ends, wherein devices 20 and 22 are positioned parallel to one another as shown in FIG. 9. Toe gauge tools 46 and 48 can then be attached to devices 20 and 22, and a datum line 87 disposed between the tools 46 and 48 to complete the toe calibration.

The calibration of the thrust bar 60 is accomplished with calibration plate 82 and its associated bolt 86, one of the plates 83, and the thrust calibration tool 80. As shown in FIG. 10, calibration plate 82 is secured to the inside of device 20 with the plate 83 (not shown) and bolt 86 (not shown). The elongated openings of plate 82 receive the flanges 106 and 108. Toe gauge tool 46 is coupled to the device 20 with the thrust bar 60 attached. The calibration tool 80 is positioned on the plate 82, at a right angel thereto. A top straight edge 89 of the tool 80 is positioned adjacent to the thrust bar 60 which is then adjusted accordingly.

A pair of steering axis inclination (SAI) blocks 72 facilitate measuring the SAI. As shown in FIG. 11, the SAI blocks 72 are secured to the device, such as device 20, to permit the camber gauge tool 52 to be positioned substantially parallel to the device 20, rather than the typical right angle position used for measuring camber.

Although a two wheel wheelless alignment apparatus is disclosed herein, it will be readily apparent to one skilled in the art that the same inventive concept can be extended to four wheel wheelless alignment applications by providing two additional devices substantially similar to devices 20 and 22, two additional pivot bars, and two additional toe gauge tools with a kit (not shown) substantially similar to the kit 10. However, two slip plates of a conventional nature would be utilized for the rear wheel devices (not shown) instead of two turntables.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

a pair of triangular support flanges, each one of said flanges extending from a corresponding support leg portion and having an associated set of said horizontal offset openings.

3. A wheelless alignment apparatus according to claim 2, wherein both sets of said flange horizontal offset openings includes about six horizontal offset openings.

4. A wheelless alignment apparatus according to claim 1, wherein said vertical position adjustment means includes a pivot bar having two spaced apart pairs of fixture height members extending upwardly therefrom, each pair of said fixture height members being spaced apart to receive a corresponding one of said flanges therebetween, and each one of said fixture height members having an associated set of said vertical offset openings.

5. A wheelless alignment apparatus according to claim 4, wherein said group of vertical offset openings includes about six vertical offset openings.

6. A wheelless alignment apparatus according to claim 1, further including measurement means for determining a combination of one of said horizontal offset openings and one of said vertical offset openings corresponding to the removed wheel.

TABLE I

| TIRE WIDTH | 1.5 | 2 | 2.5 | 3 | 3.5 | 4 | 4.5 | 5 | 5.5 | 6 | 6.5 | 7 | 7.5 | 8 | 8.5 | 9 | 9.5 | 10 |
|---|---|---|---|---|---|---|---|---|---|---|---|---|---|---|---|---|---|---|
| 12 | 1 | | 1 | | 1 | | 1 | | 1 | | 2 | | 3 | | 4 | | 5 | |
| 11 | 1 | | 1 | | 1 | | 1 | | 2 | | 3 | | 4 | | 5 | | 6 | |
| 10 | 1 | | 1 | | 1 | | 1 | | 2 | | 3 | | 4 | | 5 | | 6 | |
| 9  | 1 | | 1 | | 1 | | 2 | | 3 | | 4 | | 5 | | 6 | | 6 | |
| 8  | 1 | | 1 | | 1 | | 2 | | 3 | | 4 | | 5 | | 6 | | 6 | |
| 7  | 1 | | 1 | | 2 | | 3 | | 4 | | 5 | | 6 | | 6 | | 6 | |
| 6  | 1 | | 1 | | 2 | | 3 | | 4 | | 5 | | 6 | | 6 | | 6 | |
| 5  | 1 | | 2 | | 3 | | 4 | | 5 | | 6 | | 6 | | 6 | | 6 | |
| 4  | 1 | | 2 | | 3 | | 4 | | 5 | | 6 | | 6 | | 6 | | 6 | |

WHEEL OFFSET

What is claimed is:

1. A wheelless alignment apparatus for a vehicle having a strut assembly and a removed wheel, comprising:

rigid fixture means having a strut assembly coupling portion and including a pair of spaced apart support leg portions for helping to support the vehicle;

plate means coupled to said strut assembly coupling portion for engaging the vehicle strut assembly to help secure the rigid fixture means to the vehicle;

horizontal position adjustment means having a group of horizontal offset openings for enabling the horizontal position of said support leg portions to be adjusted;

vertical position adjustment means having a group of vertical offset openings for enabling the vertical position of said support leg portions to be adjusted;

coupling means for coupling pivotally said horizontal position adjustment means and said vertical position adjustment means; and turntable means for facilitating the pivoting of said support leg portions relative to the vehicle to support movably said rigid fixture means.

2. A wheelless alignment apparatus according to claim 1, wherein said horizontal position adjustment means includes 7. A wheelless alignment apparatus according to claim 1, wherein said plate means includes an outer portion having a plurality of spaced apart mounting openings and an interior portion having a central opening and a plurality of lug bolt receiving openings disposed about said central opening to secure said plate means to the strut assembly, said rigid fixture means further includes a plurality of spaced apart mounting bolts disposed about a central opening for securing said plate means to said rigid fixture means with said interior portion substantially disposed within said central opening.

8. A wheelless alignment apparatus according to claim 7, further including another plate means having another outer portion and another interior portion having another central opening and a plurality of additional lug bolt receiving openings disposed about said another central opening, said another interior portion being recessed from said another outer portion and adapted to be received within said central opening, wherein said another outer portion engages said interior portion to secure said rigid fixture means and said plate means when said another plate means is secured to the strut assembly.

9. A wheelless alignment apparatus according to claim 7, wherein said central opening and said plurality of lug bolt receiving openings are adapted to accommodate four and five lug bolt strut assemblies.

10. A wheelless alignment apparatus according to claim 7, wherein said central opening and said plurality of lug bolt receiving openings are adapted to accommodate six and eight lug bolt strut assemblies.

11. A wheelless alignment apparatus according to claim 8, wherein said another central opening and said plurality of additional lug bolt receiving openings are adapted to accommodate vehicles with unusual lug bolt patterns.

12. A wheelless alignment apparatus according to claim 1, further including a ride height bar and a wheel width bar.

13. A wheelless alignment apparatus according to claim 1, further including another rigid fixture means, toe measuring means coupled to both said rigid fixture means and said another rigid fixture means for measuring vehicle toe, and an adjustable toe line disposed between said toe measuring means.

14. A wheelless alignment apparatus for a vehicle having a strut assembly, a rear wheel and a removed front wheel, comprising:
   rigid fixture means secured to the vehicle in place of the removed front wheel for pivotally supporting the strut assembly;
   turntable means for supporting movably said rigid fixture means;
   said rigid fixture means including a rod coupled thereto and extending outwardly therefrom for facilitating the measurement of thrust;
   a thrust line coupled at one end thereof to said rigid fixture;
   thrust bar means having a hole therethrough for receiving said rod therein to help couple said thrust line to said rigid fixture, said thrust bar means including indicia thereon to aid in determining the thrust;
   a thrust collar secured to another end of said thrust line to help ascertain the thrust; and
   thrust measuring means coupled to the rear wheel for receiving slidably said thrust collar thereon, said thrust measuring means including indicia thereon to facilitate measuring the thrust.

15. A wheelless alignment apparatus according to claim 14, wherein said thrust measuring means includes a pair of chock blocks each having a mounting bolt extending outwardly therefrom for positioning on either side of the rear wheel, an elongated thrust plate having a pair of spaced apart openings to receive the mounting bolts therein for securing said thrust plate to said chock blocks, and a centrally disposed thrust gauge rod extending outwardly from said thrust plate at about a right angle thereto for receiving said thrust collar.

16. A wheelless alignment apparatus according to claim 14, wherein said thrust collar is elongated with a central opening therein to enable said thrust gauge rod to be viewed, said thrust collar including an indicating device surrounding said thrust collar at said central opening to facilitate aligning said thrust collar with said thrust measuring means indicia to measure the thrust.

17. A method of aligning a vehicle with a strut assembly in a wheelless manner, comprising:
   using a rigid fixture means having a strut assembly coupling portion and including a pair of spaced apart support leg portions for helping to support the vehicle, and a turntable means;
   coupling a plate means to said strut assembly coupling portion;
   selecting a horizontal offset position from a horizontal position adjustment means for said support leg portions;
   selecting a vertical offset position from a vertical position adjustment means for said support leg portions;
   coupling said horizontal position adjustment means and said vertical position adjustment means; and
   pivoting said support leg portions relative to the vehicle for supporting said rigid fixture means.

18. A method according to claim 17, further including:
   using another plate means having an interior portion recessed from an outer portion, said plate means having a central opening adapted to receive said another plate means;
   disposing said interior portion within said central opening, wherein said outer portion engages said plate means; and
   engaging the strut assembly with said another plate means to secure said plate means and said rigid fixture means to the strut assembly.

19. A method according to claim 17, further including:
   using another rigid fixture means;
   coupling a toe measuring means to said rigid fixture means and said another rigid fixture means;
   disposing a toe line between said toe measuring means; and
   adjusting the length of said toe line to accommodate the vehicle size.

20. A method of aligning a vehicle with a strut assembly, an installed rear wheel, and a removed front wheel, in a wheelless manner, comprising:
   securing a rigid fixture means having a rod coupled thereto, and extending outwardly therefrom, to the vehicle in place of the removed front wheel;
   supporting said rigid fixture means with a turntable means;
   disposing a thrust bar on said rod;
   coupling one end of a thrust line to said thrust bar;
   disposing a thrust gauge rod at said rear wheel, and extending outwardly therefrom at a right angle thereto;
   disposing a thrust collar at another end of said thrust line;
   positioning said thrust collar over said thrust gauge rod to measure the thrust.

21. A kit for performing a wheelless alignment of a vehicle having a strut assembly, comprising:
   a pair of rigid fixture assemblies, said fixture assemblies including a strut assembly coupling portion, a pair of support leg portions, and a pair of horizontal position adjustment flanges having a group of horizontal offset openings;
   a pair of pivot bars, each pivot bar including two spaced apart pairs of fixture height members extending upwardly therefrom and having a group of vertical offset openings, each of said pairs of fixture height members being spaced apart to receive said associated horizontal position adjustment flanges therebetween;
   coupling means for coupling pivotally said horizontal position adjustment flanges to said pairs of fixture height members;
   a pair of turntables for supporting movably said rigid fixture assemblies;
   a ride height measurement means for determining one of said group of vertical offset openings to utilize; and tire width measurement means for determining one of said group of horizontal offset openings to utilize.

22. A kit according to claim 21, further including:

plate means for coupling said rigid fixture assemblies to the strut assembly, said plate means including an outer portion having a plurality of spaced apart mounting openings and an interior portion having a central opening and a plurality of lug bolt receiving openings disposed about said central opening to secure said plate means to the strut assembly, said rigid fixture assemblies further including a plurality of spaced apart mounting bolts disposed about a central opening for securing said plate means to said rigid fixture assemblies with said interior portion substantially disposed within said central openings.

23. A kit according to claim 22, further including another plate means having another outer portion and another interior portion having another central opening and a plurality of additional lug bolt receiving openings disposed about said another central opening, said another interior portion being recessed from said another outer portion and adapted to be received within said central opening, wherein said another outer portion engages said interior portion to secure said rigid fixture assemblies and said plate means when said another plate means is secured to the strut assembly.

24. A kit according to claim 21, further including thrust measuring means.

25. A kit according to claim 21, further including steering axis inclination measuring means for determining steering axis inclination.

26. A kit according to claim 24, further including an adjustable thrust line.

* * * * *